United States Patent
Govari

(10) Patent No.: US 11,823,373 B1
(45) Date of Patent: Nov. 21, 2023

(54) INSPECTION APPARATUS

(71) Applicant: BIOSENSE WEBSTER (ISRAEL) LTD., Yokneam (IL)

(72) Inventor: Assaf Govari, Haifa (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 9 days.

(21) Appl. No.: 17/874,418

(22) Filed: Jul. 27, 2022

(51) Int. Cl.
*G06V 10/764* (2022.01)
*G06T 7/00* (2017.01)
*G06V 10/82* (2022.01)
*G06V 10/774* (2022.01)
*H04N 23/51* (2023.01)
*H04N 23/56* (2023.01)
*H04N 23/90* (2023.01)

(52) U.S. Cl.
CPC ............ *G06T 7/001* (2013.01); *G06V 10/764* (2022.01); *G06V 10/774* (2022.01); *G06V 10/82* (2022.01); *H04N 23/51* (2023.01); *H04N 23/56* (2023.01); *H04N 23/90* (2023.01); *G06T 2207/10152* (2013.01); *G06T 2207/20081* (2013.01); *G06T 2207/20084* (2013.01); *G06T 2207/30108* (2013.01)

(58) Field of Classification Search
CPC ..... A61B 5/0031; A61B 5/076; A61B 5/6882; A61B 2560/0219; A61B 5/0215; A61B 2562/0209; A61B 2576/023; A61B 5/287; A61B 5/361; A61B 5/6859
USPC .......................................................... 348/92
See application file for complete search history.

(56) References Cited

U.S. PATENT DOCUMENTS

| | | | |
|---|---|---|---|
| 5,234,411 A | 8/1993 | Vaillancourt | |
| 6,585,718 B2 * | 7/2003 | Hayzelden | A61M 25/0141 604/524 |
| 6,980,843 B2 * | 12/2005 | Eng | A61B 34/73 606/41 |
| 7,578,165 B1 | 8/2009 | Stupecky | |
| 2005/0283178 A1 | 12/2005 | Flagle | |
| 2009/0251535 A1 | 10/2009 | Maehringer-Kunz | |
| 2016/0262829 A1 * | 9/2016 | Govari | A61B 18/14 |

FOREIGN PATENT DOCUMENTS

EP 3569145 A1 * 11/2019 ............. A61B 18/12
WO WO-2017185705 A1 * 11/2017

* cited by examiner

*Primary Examiner* — Masum Billah

(57) ABSTRACT

A jig for inspecting a tip of a catheter at a first facility of at least two facilities at which the catheter is processed during manufacturing. The jig includes a housing, at least one clamp, a plurality of cameras mounted in the housing, a plurality of illuminators mounted in the housing and a processor. The processor operates the plurality of cameras and the plurality of illuminators for capturing a plurality of images, and transfers respective copies of the plurality of images to a second facility, separate from the first facility. The processor is additionally configured to generated a report generate a report of the inspection from the first facility and the second facility based on annotations received from the first facility and the second facility.

16 Claims, 5 Drawing Sheets

INSPECTION APPARATUS

FIELD OF THE DISCLOSURE

This disclosure relates generally to inspection of medical equipment, and specifically to detecting defects in catheters.

BACKGROUND

Before use, medical equipment should be checked to ensure there are no defects present in the equipment. Some examples of systems for inspecting medical equipment are described below:

U.S. Patent Application 2009/0251535, to Maehringer-Kunz et al., describes a device for automatic illumination and inspection of tubular probes. The device is stated to have rotatable means for holding the probes that are to be inspected, and to have an electronic camera and means for illuminating the probes that are to be inspected.

U.S. Pat. No. 7,578,165, to Stupecky, describes measurement devices and methods for measuring balloon catheters. The devices are stated to enable measuring the outer dimensions and burst pressure of a balloon catheter.

U.S. Pat. No. 5,234,411, to Vaillancourt, describes a container assembly that has a pierceable membrane through which the hollow needle of a connector may pass to permit pre-inflation of a balloon. The system is stated to be for use in conjunction with a flow directed type catheter for viewing the expansion of the balloon-tipped end of the flow directed type catheter within a sealed chamber of the container assembly.

U.S. Patent Application 2005/0283178, to Flagle et al., describes a delivery system that is stated to facilitate a visual inspection of an intraluminal medical device included in the delivery system.

DESCRIPTION OF EXAMPLES

Overview

Figure 1:
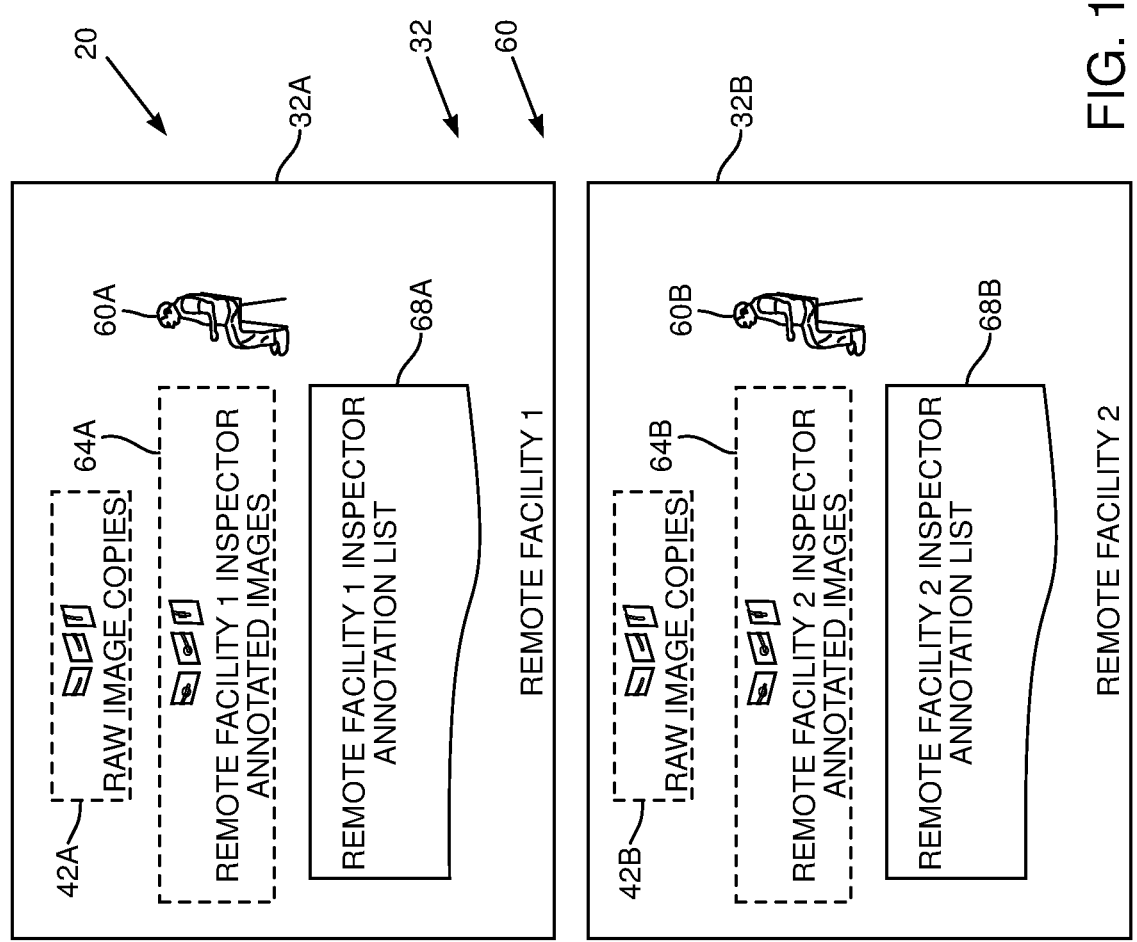
FIG. 1 is a schematic diagram illustrating an inspection system for a catheter.
Figure 1:
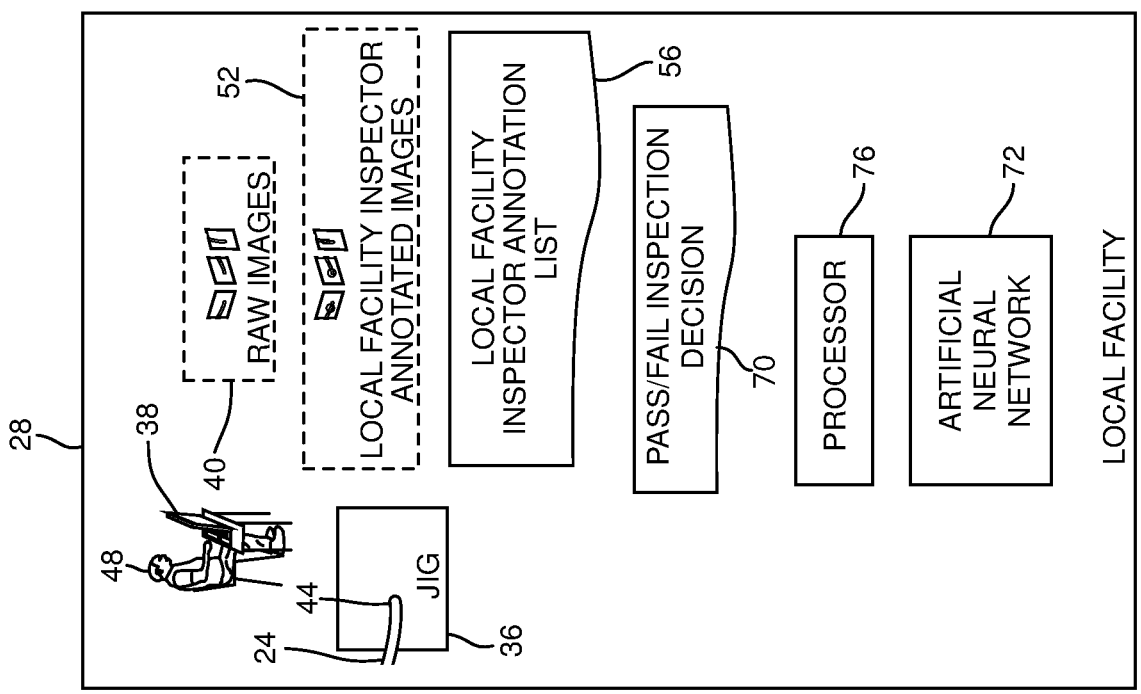
Figure 2:
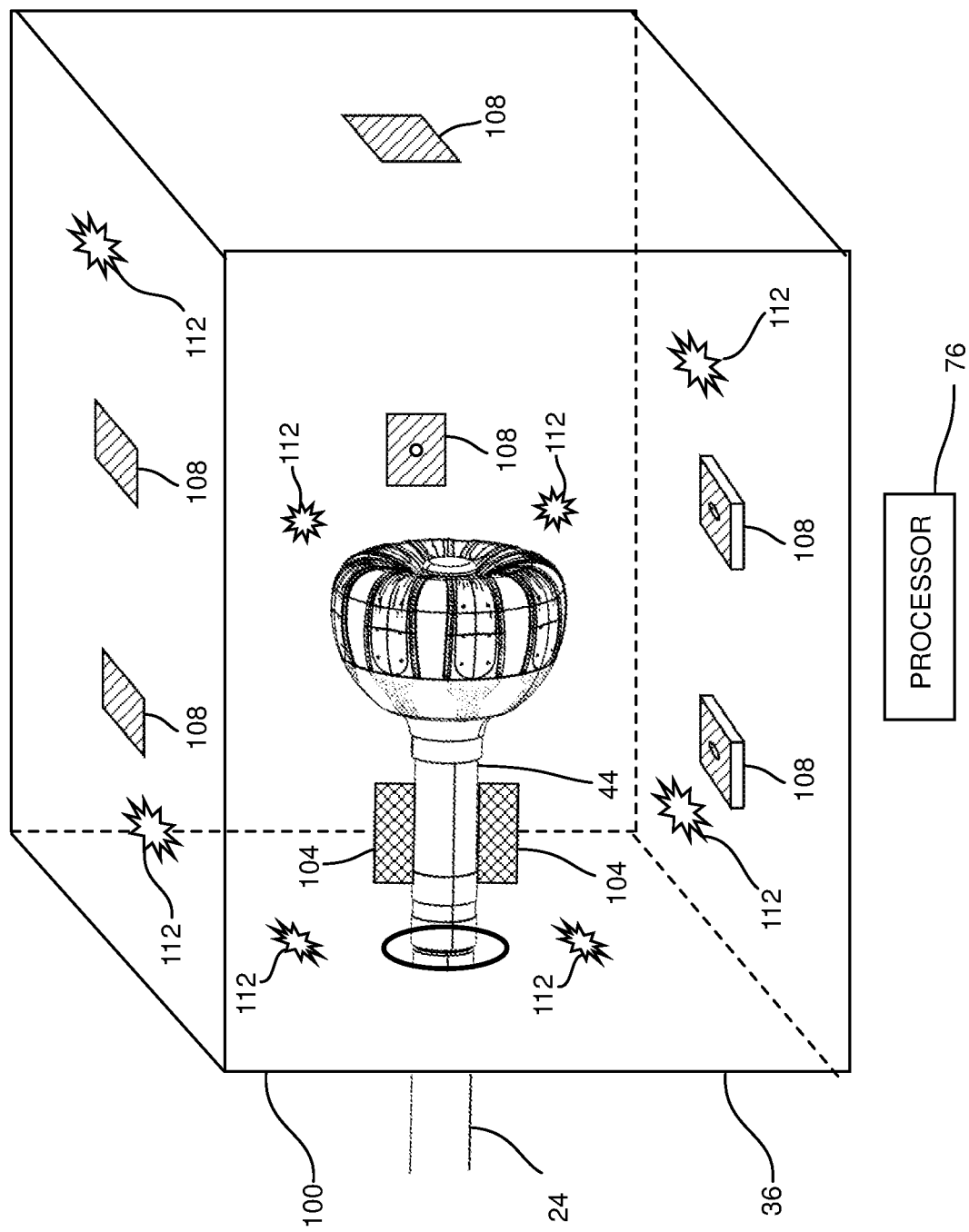
FIG. 2 is a schematic drawing of a jig of the system.
Figure 3:
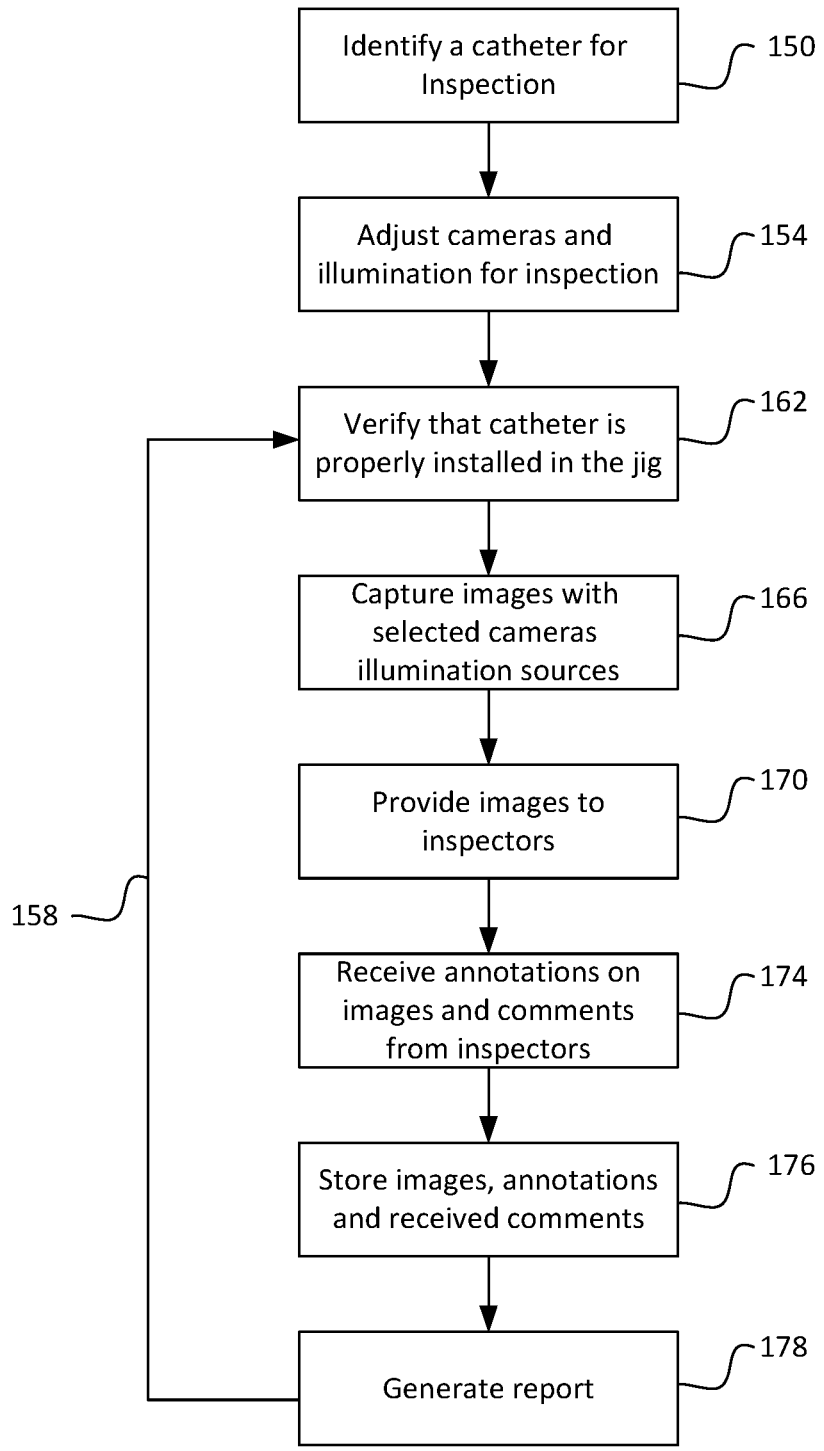
FIG. 3 is a flowchart listing steps performed in generating a corpus of data that is used to train an artificial neural network.
Figure 4:
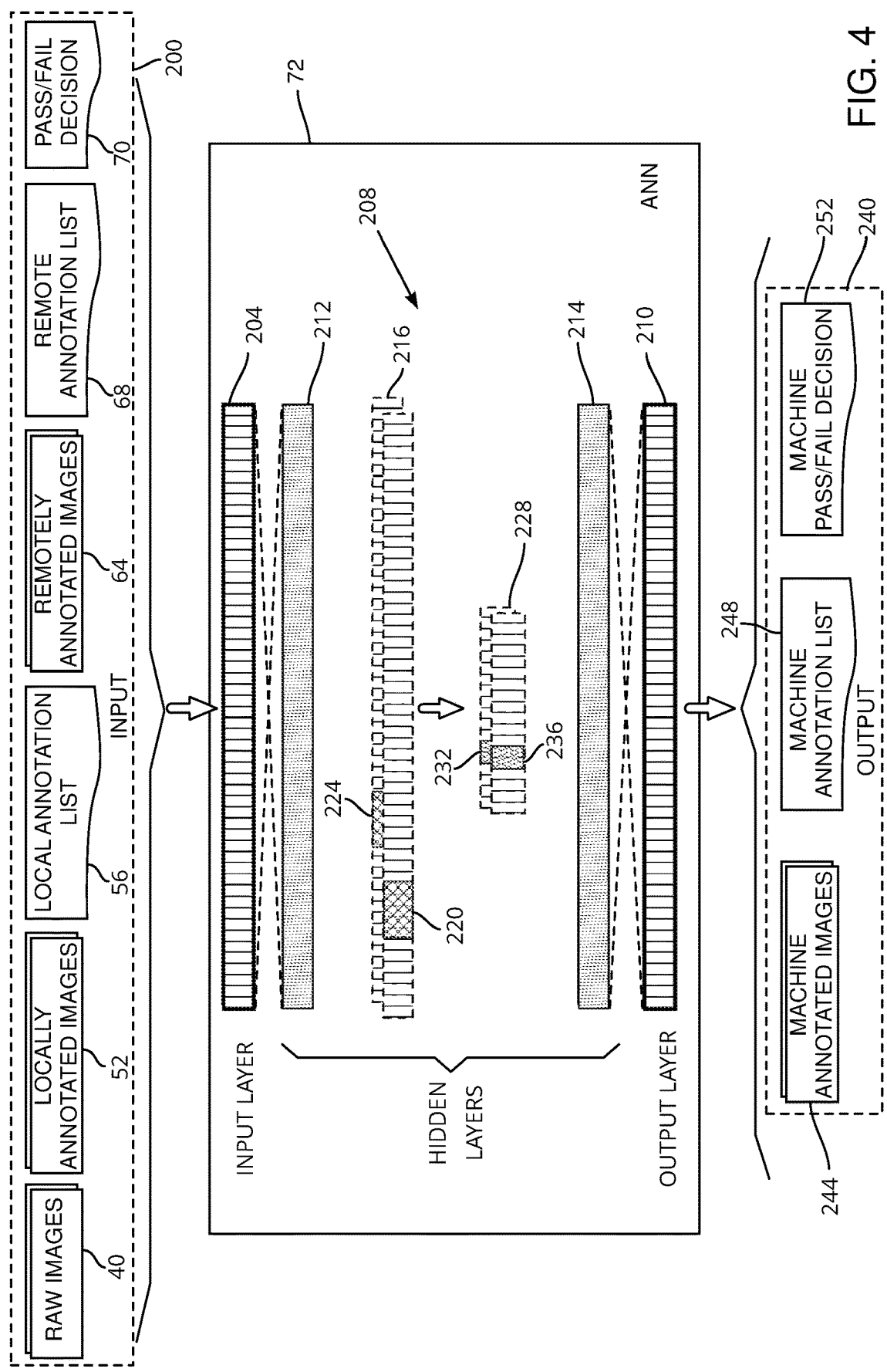
FIG. 4 is a schematic block diagram illustrating the overall structure and operation of the artificial neural network.
Figure 5:
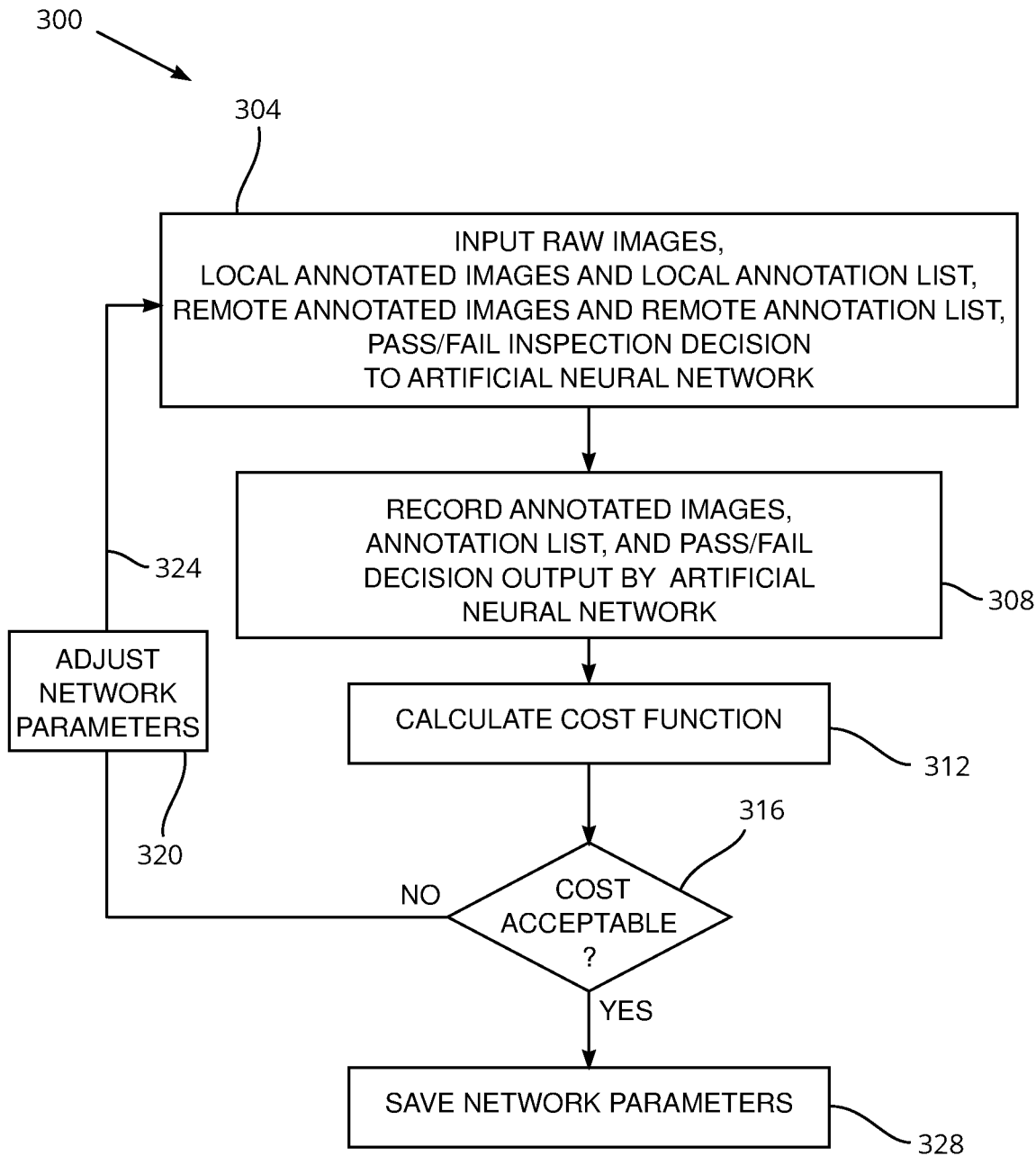
FIG. 5 is a flowchart of an algorithm for training the artificial neural network.

A stage in the production of a medical catheter is inspection of the catheter tip to ensure that the tip conforms with specifications that have been defined for the catheter tip. The specifications defined are typically objective specifications, such as dimensions of elements of the tip and other properties such as impedances of electrodes of the tip. The inspection, which may be manual and/or automatic, typically generates a list of parameter values corresponding to the specifications, and review of the list determines whether or not the catheter tip is suitable or unsuitable for use.

However, the inventors have found that manual inspection of the catheter tip in practice typically generates situations where, while conforming with the objective specifications, the catheter tip may still be considered to be unsuitable for use. For example, one electrode on the tip may appear to have a matte finish, compared to other electrodes that have a reflective finish. Or, one of the electrodes may have a scratch. As a further example, in the case of a basket catheter the catheter spines may deploy asymmetrically.

Such situations are typically subjective, revealing subjective defects of the tip that are recognized in response to the manual inspection of the tip, and that may not have been included in the objective specifications. The manual inspection may be performed at a first facility, i.e., where the catheter is produced. The manual inspection may also be performed at other facilities, e.g., at a facility that receives the catheter after initial production, and that further processes the catheter. Because of the subjective nature of the manual inspection, defects identified by the two inspections may not correspond, e.g., the inspection at one of the other facilities may identify an asymmetry in a deployed balloon catheter, whereas such an asymmetry may not be registered in the first facility.

The present disclosure addresses the problems illustrated by the examples above by providing images of a catheter tip to a local inspector and to a remote inspector. The catheter is placed in a jig at the local manufacturing or production facility. The jig is pre-configured with lighting, e.g., illuminators, that illuminates the tip, and cameras to image the tip. The lighting and cameras are mounted on a plurality of different planes of the jig so that tip may be inspected from all sides. As stated above, the tip images are provided to the inspectors at different facilities, and the inspectors respectively annotate the images with identified defects and list the defects they have identified. In this manner, inspectors from different facilities may share information and together reach a decision regarding the suitability of the catheter, i.e., whether the catheter will function correctly, without the need to perform an additional inspection at the remote site. Based on the combined input from the different facilities, the local inspector may decide if the catheter passes/fails inspection and generate a report that includes the decision reached based on the combined input. The report may be stored in memory and also shared with each of the manufacturing facilities.

The process of generating images, local annotated images, remote annotated images, local lists of annotations, remote lists of annotations, and forming a decision is repeated for other catheters, all of the same type, that are placed in the jig. This generates a sub-corpus of data (raw images, local annotated images, remote annotated images, local lists of annotations, remote lists of annotations, decisions) for the type of catheter tip being inspected.

In some example embodiments, the data sub-corpus is used to train an artificial neural network to recognize subjective-type defects in the type of catheter tip used to build the sub-corpus. Once trained, the network is used to identify automatically, from raw images of a catheter under test in the jig, subjective-type defects that would typically only be found by manual inspection of the catheter tip.

Optionally, the jig may be configured for imaging different types of catheter tips. For each different type the lighting and the cameras of the jig may be adjusted manually or automatically to provide optimal images of the tips. A data sub-corpus may be assembled for each different type, and the network may be trained using the different sub-corpuses, substantially as described above, to identify automatically subjective-type defects for each of the different types. The multiple data sub-corpuses form a corpus of data, and it will be understood that by training the network with this corpus, the network is able to identify automatically subjective-type defects for all the different types.

In operation at the production facility, in some examples of the invention the jig may be configured to identify the different types of catheter tips automatically, and to adjust the lighting and the cameras accordingly. Once the type of tip has been identified, the trained network may be used to identify automatically subjective-type defects of the tip.

While the description above summarizes how a trained network may be used automatically to identify subjective-type defects of a catheter tip from images of the tip, it will be appreciated that the network may also be trained to identify objective defects in the tip from the images.

Such objective defects comprise, for example, deviations from prescribed dimensions of the tip or its elements, such as the radius and/or length of a focal catheter, and/or the location and width of electrodes in focal or other catheters.

It will thus be appreciated that a trained network may be used to identify both subjective and objective defects in catheter tips, as well as to generate a recommendation as to whether the catheter should pass or fail inspection and report that recommendation to the user. The generated recommendation may include images, annotations on the images, notes from the various inspectors if received and the generated recommendations. Images prior to added annotations are referred to herein as raw images.

System Description

EXAMPLES

Example 1. A method, comprising:
receiving images (40), of a catheter (24) configured to be inserted into a lumen of a human subject, captured in a production facility (28) of the catheter;
receiving first annotations (52) on the images of first defects of the catheter;
formulating, at a further facility (32A), separate from the production facility, processing the catheter, second annotations (64A) on respective copies (42A) of the images of second defects of the catheter; and
training an artificial neural network (72) using the images, the first annotations, and the second annotations to detect defects in further catheters produced in the production facility.

Example 2. The method according to example 1, and comprising providing a jig (36) at the production facility that is configured to capture the images.

Example 3. The method according to example 2, wherein the images comprise initial images, and wherein the jig is configured to identify a type of the catheter from the initial images.

Example 4. The method according to example 3, wherein the images used to train the artificial neural network comprise images acquired subsequent to the initial images.

Example 5. The method according to example 3, wherein the further catheters produced in the production facility have the identified type of the catheter.

Example 6. The method according to example 2, wherein the jig is configured to receive and fixedly grip the catheter prior to capturing the images.

Example 7. The method according to example 6, wherein the images comprise images of a tip (44) of the catheter, the method further comprising adjusting at least one clamp (104) of the jig to fixedly grip the catheter so that no part of the tip is obscured in the images of the tip.

Example 8. The method according to example 1, wherein the catheter comprises a tip (44), and wherein the received images comprise tip images, and wherein training the artificial network comprises training the network, using the tip images, first annotations of the tip images, and second annotations of respective copies of the tip images, to detect defects in tips of the further catheters.

Example 9. The method according to example 8, wherein the tip of the catheter has a plurality of states, and wherein training the artificial network comprises training the network, to detect defects in tips of the further catheters in the plurality of states.

Example 10. The method according to example 9, wherein a first state of the plurality comprises the tip in an undeployed state corresponding to the tip being within the lumen, and a second state comprises the tip in a deployed state corresponding to the tip being in a heart of the human subject.

Example 11. The method according to example 1, and comprising formulating a pass/fail inspection decision (70) for the catheter in response to the images, the first annotations, and the second annotations, and training the artificial neural network using the decision to formulate further pass/fail inspection decisions for the further catheters produced in the production facility.

Example 12. Apparatus, comprising:
an artificial neural network (72); and
a processor (76), configured to
receive images (40), of a catheter (24) configured to be inserted into a lumen of a human subject, captured in a production facility (28) of the catheter,
receive first annotations (52) on the images of first defects of the catheter,
receive second annotations (64A), on respective copies (42A) of the images of second defects of the catheter, formulated at a further facility (32A), separate from the production facility, processing the catheter, and
training the artificial neural network using the images, the first annotations, and the second annotations to detect defects in further catheters produced in the production facility.

Example 13. The apparatus according to example 12, and comprising a jig (36) located at the production facility that is configured to capture the images.

Example 14. The apparatus according to example 13, wherein the images comprise initial images, and wherein the jig is configured to identify a type of the catheter from the initial images.

Example 15. The apparatus according to example 14, wherein the images used to train the artificial neural network comprise images acquired subsequent to the initial images.

Example 16. The apparatus according to example 14, wherein the further catheters produced in the production facility have the identified type of the catheter.

Example 17. The apparatus according to example 13, wherein the jig is configured to receive and fixedly grip the catheter prior to capturing the images.

Example 18. The apparatus according to example 17, wherein the images comprise images of a tip (44) of the catheter, and comprising at least one clamp (104) of the jig that fixedly grips the catheter and that is adjusted so that no part of the tip is obscured in the images of the tip.

Example 19. The apparatus according to example 12, wherein the catheter comprises a tip (44), and wherein the received images comprise tip images, and wherein training the artificial network comprises training the network, using the tip images, first annotations of the tip images, and second annotations of respective copies of the tip images, to detect defects in tips of the further catheters.

Example 20. The apparatus according to example 19, wherein the tip of the catheter has a plurality of states, and wherein training the artificial network comprises training the network to detect defects in tips of the further catheters in the plurality of states.

Example 21. The apparatus according to example 20, wherein a first state of the plurality comprises the tip in an undeployed state corresponding to the tip being within the lumen, and a second state comprises the tip in a deployed state corresponding to the tip being in a heart of the human subject.

Example 22. The apparatus according to example 12, and comprising formulating a pass/fail inspection decision (70) for the catheter in response to the images, the first annotations, and the second annotations, and training the artificial neural network using the decision to formulate further pass/fail inspection decisions for the further catheters produced in the production facility.

Example 23. A jig (36) for inspecting a tip (44) of a catheter (24) at a first facility (52) of at least two facilities (52,64) at which the catheter (24) is processed during manufacturing, the jig (36) comprising; a housing (100) configured to house the tip (44) of the catheter (24) during inspection; at least one clamp (104) configured to fixedly position the tip (44) within the housing (100); a plurality of cameras (108) mounted in the housing (100), said plurality of cameras (108) configured to capture images (40) of the tip (44) from different angles; a plurality of illuminators (112) mounted in the housing, said plurality of illuminators (112) configured to illuminate the tip (44) from different angles; a processor (76), configured to: selectively operate the plurality of cameras (108) and the plurality of illuminators (112) based on the catheter (24) mounted within the housing (100), transfer respective copies of the plurality of images (40) to a second facility (68), separate from the first facility (56), processing the catheter (24), receive first annotations on the images of defects of the catheter (24) from the first facility (56), and receive second annotations on the respective copies of the images of defects of the catheter (24) from the second facility (68); and generate a report of the inspection from the first facility (56) and the second facility (68) based on the first annotations and the second annotations; wherein the processor (76) is associated with a user interface for interfacing with a user and memory for storing the plurality of images include the first annotations and second annotations (40, 52, 56).

Example 24. The apparatus according to example 23, wherein the images comprise initial images, and wherein the processor is configured to identify a type of the catheter from the initial images.

Example 25. The jig according to example 23, wherein the plurality of cameras (108) includes at least two cameras mounted on different walls of the housing (100).

Example 26. The jig (36) according to example 23, wherein the plurality of cameras (108) includes at least one camera that captures images at a wavelength or polarization that is other than that of another camera from the plurality of cameras (108).

Example 27. The jig (36) according to example 23, wherein the plurality of illuminator includes at least one illuminator that emits light at a different wavelength than that of another illuminator from the plurality of illuminators.

It will be appreciated that the examples described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A jig for inspecting a tip of a catheter at a first facility of at least two facilities at which the catheter is processed during manufacturing, the jig comprising:
    a housing configured to house a tip of the catheter during inspection;
    at least one clamp configured to fixedly position the tip within the housing;
    a plurality of cameras mounted in the housing, said plurality of cameras configured to capture images of the tip from different angles;
    a plurality of illuminators mounted in the housing, said plurality of cameras configured to illuminate the tip from different angles;
    a processor, configured to:
        selectively operate the plurality of cameras and the plurality of illuminators based on the catheter mounted within the housing,
        transfer respective copies of the plurality of images to a second facility, separate from the first facility, processing the catheter,
        receive first annotations on the images of defects of the catheter from the first facility, and
        receive second annotations on the respective copies of the images of defects of the catheter from the second facility; and
        generate a report of the inspection from the first facility and the second facility based on the first annotations and the second annotations;
    wherein the processor is associated with a user interface for interfacing with a user and memory for storing the plurality of images include the first annotations and second annotations.

2. The jig according to claim 1, wherein the plurality of images comprise initial images, and wherein the processor is configured to identify a type of the catheter from the initial images.

3. The jig according to claim 1, wherein the plurality of cameras includes at least two cameras mounted on different walls of the housing.

4. The jig according to claim 1, wherein the plurality of cameras includes at least one camera that captures images at a wavelength or polarization that is other than that of another camera from the plurality of cameras.

5. The jig according to claim 1, wherein the plurality of illuminator includes at least one illuminator that emits light at a different wavelength than that of another illuminator from the plurality of illuminators.

6. Apparatus, comprising:
    an artificial neural network; and
    a processor, configured to
    receive images, of a catheter configured to be inserted into a lumen of a human subject, captured in a production facility of the catheter,
    receive first annotations on the images of first defects of the catheter,
    receive second annotations, on respective copies of the images of second defects of the catheter, formulated at a further facility, separate from the production facility, processing the catheter, and training the artificial neural network using the images, the first annotations, and the second annotations to detect defects in further catheters produced in the production facility.

7. The apparatus according to claim 6, and comprising a jig located at the production facility that is configured to capture the images.

8. The apparatus according to claim 7, wherein the images comprise initial images, and wherein the jig is configured to identify a type of the catheter from the initial images.

9. The apparatus according to claim 8, wherein the images used to train the artificial neural network comprise images acquired subsequent to the initial images.

10. The apparatus according to claim 8, wherein the further catheters produced in the production facility have the identified type of the catheter.

11. The apparatus according to claim 7, wherein the jig is configured to receive and fixedly grip the catheter prior to capturing the images.

12. The apparatus according to claim 11, wherein the images comprise images of a tip of the catheter, and comprising at least one clamp of the jig that fixedly grips the catheter and that is adjusted so that no part of the tip is obscured in the images of the tip.

13. The apparatus according to claim 6, wherein the catheter comprises a tip, and wherein the received images comprise tip images, and wherein training the artificial network comprises training the network, using the tip images, first annotations of the tip images, and second annotations of respective copies of the tip images, to detect defects in tips of the further catheters.

14. The apparatus according to claim 13, wherein the tip of the catheter has a plurality of states, and wherein training the artificial network comprises training the network to detect defects in tips of the further catheters in the plurality of states.

15. The apparatus according to claim 14, wherein a first state of the plurality comprises the tip in an undeployed state corresponding to the tip being within the lumen, and a second state comprises the tip in a deployed state corresponding to the tip being in a heart of the human subject.

16. The apparatus according to claim 6, and comprising formulating a pass/fail inspection decision for the catheter in response to the images, the first annotations, and the second annotations, and training the artificial neural network using the decision to formulate further pass/fail inspection decisions for the further catheters produced in the production facility.

\* \* \* \* \*